(12) United States Patent
Gao (10) Patent No.: US 10,142,831 B2
(45) Date of Patent: Nov. 27, 2018

(54) SIM CARD SIGNAL CONVERSION METHOD AND APPARATUS

(71) Applicant: Huawei Device Co., Ltd., Shenzhen (CN)

(72) Inventor: Chunyu Gao, Shenzhen (CN)

(73) Assignee: Huawei Device (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 15/022,155

(22) PCT Filed: Jul. 14, 2014

(86) PCT No.: PCT/CN2014/082124
§ 371 (c)(1),
(2) Date: Mar. 15, 2016

(87) PCT Pub. No.: WO2015/035825
PCT Pub. Date: Mar. 19, 2015

(65) Prior Publication Data
US 2016/0234680 A1 Aug. 11, 2016

(30) Foreign Application Priority Data

Sep. 16, 2013 (CN) .......................... 2013 1 0422911

(51) Int. Cl.
*H04B 7/24* (2006.01)
*H04B 1/00* (2006.01)
(Continued)

(52) U.S. Cl.
CPC ............. *H04W 8/245* (2013.01); *H04L 67/12* (2013.01); *H04L 67/2823* (2013.01);
(Continued)

(58) Field of Classification Search
CPC .. G06F 13/105; G06F 13/385; G06F 17/5022; G06F 21/34; G06F 21/85;
(Continued)

(56) References Cited

U.S. PATENT DOCUMENTS 5,353,328 A * 10/1994 Jokimies ............... H04W 88/02
455/466
6,584,326 B1 * 6/2003 Boydston .............. G06F 13/385
455/423

(Continued)

FOREIGN PATENT DOCUMENTS

CN 2651862 Y 10/2004
CN 1607556 A 4/2005
(Continued)

*Primary Examiner* — Yuwen Pan
*Assistant Examiner* — Paul P Tran (57) ABSTRACT

The method of the present invention includes: obtaining an original signal outputted by a SIM card; converting the original signal into a target signal, where under an equal transmission condition and/or at an equal transmission distance, signal attenuation and/or distortion of the target signal are/is less than signal attenuation and/or distortion of the original signal; and sending the target signal to a terminal device, where the terminal device obtains the target signal by using a signal transmission line, and the SIM card exists independent of the terminal device. In the present invention, a SIM card may be separated from a terminal device, and a generated target signal may be transmitted over a relatively long distance by using a signal transmission line, which can satisfy an application that requires a SIM card to be placed far away from a terminal device.

12 Claims, 3 Drawing Sheets

(51) Int. Cl.

| | | |
|---|---|---|
| *H04B 7/00* | (2006.01) | |
| *H04M 1/00* | (2006.01) | |
| *G06K 5/00* | (2006.01) | |
| *G06K 19/06* | (2006.01) | |
| *H04Q 5/22* | (2006.01) | |
| *H04W 4/00* | (2018.01) | |
| *H04L 12/28* | (2006.01) | |
| *G06Q 20/00* | (2012.01) | |
| *H04W 8/24* | (2009.01) | |
| *H04W 4/18* | (2009.01) | |
| *H04W 12/00* | (2009.01) | |
| *H04L 29/08* | (2006.01) | |
| *H04W 4/60* | (2018.01) | |

(52) U.S. Cl.
CPC ............ *H04W 4/18* (2013.01); *H04W 4/60* (2018.02); *H04W 12/00* (2013.01)

(58) Field of Classification Search
CPC .......... G06K 7/0008; G06K 19/07733; H04M 1/0262; H04M 1/7253; H04M 1/72575; H04M 2250/14; H04L 12/66; H04L 63/0853; H04L 67/00; H04L 67/12; H04L 67/2823; H04W 4/003; H04W 4/18; H04W 8/245; H04W 8/26; H04W 12/00; H04W 88/06; H04W 88/16; H04W 8/183; H04B 1/3816; H04B 1/40
See application file for complete search history.

(56) References Cited

U.S. PATENT DOCUMENTS

| | | | | |
|---|---|---|---|---|
| 6,615,057 | B1* | 9/2003 | Pettersson | H04L 63/0492 455/419 |
| 6,769,622 | B1* | 8/2004 | Tournemille | G06F 17/5022 235/492 |
| 6,772,956 | B1* | 8/2004 | Leaming | G06K 19/073 235/492 |
| 9,332,009 | B2* | 5/2016 | Varriale | H04L 63/0853 |
| 2001/0025882 | A1* | 10/2001 | Coulier | G06F 13/385 235/380 |
| 2006/0291483 | A1* | 12/2006 | Sela | H04L 12/66 370/401 |
| 2007/0050871 | A1 | 3/2007 | Mashhour | |
| 2007/0117587 | A1 | 5/2007 | Tsao | |
| 2007/0210174 | A1* | 9/2007 | Deprun | G06K 7/0008 235/492 |
| 2008/0075102 | A1* | 3/2008 | Madsen | G06F 13/38 370/419 |
| 2009/0172279 | A1 | 7/2009 | Yuan et al. | |
| 2012/0126009 | A1* | 5/2012 | Osen | G06K 19/07336 235/441 |
| 2012/0230489 | A1* | 9/2012 | Cho | H04L 63/0492 380/270 |
| 2013/0178243 | A1* | 7/2013 | Tsai | H04W 88/04 455/556.1 |
| 2015/0181410 | A1* | 6/2015 | Liu | G06K 7/10297 455/419 |

FOREIGN PATENT DOCUMENTS

| | | |
|---|---|---|
| CN | 101807261 A | 8/2010 |
| CN | 201600715 U | 10/2010 |
| CN | 102143458 A | 8/2011 |
| CN | 102790648 A | 11/2012 |
| EP | 1 382 973 A1 | 1/2004 |
| JP | 2001134241 A | 5/2001 |
| JP | 2001238119 A | 8/2001 |
| JP | 2009212751 A | 9/2009 |
| WO | WO 00/34877 A1 | 6/2000 |

* cited by examiner

SIM CARD SIGNAL CONVERSION METHOD AND APPARATUS

CROSS REFERENCE TO RELATED APPLICATIONS

The present application claims priority under 35 U.S.C. § 365 to International Patent Application No. PCT/CN2014/082124 filed Jul. 14, 2014 and which claims priority to Chinese Patent Application No. 201310422911.9, filed with the Chinese Patent Office on Sep. 16, 2013 and entitled "SIM CARD SIGNAL CONVERSION METHOD AND APPARATUS", which are incorporated herein by reference in their entirety.

TECHNICAL FIELD

Embodiments of the present invention relate to the communications field, and in particular, to a SIM card signal conversion method and apparatus.

BACKGROUND

Existing subscriber identity module (Subscriber Identity Module, SIM) cards are categorized into two types: integrated circuit (Integrated Circuit, IC) SIM cards and chip SIM cards.

An IC SIM card is a chip provided with a microprocessor, and five functional modules are installed inside. These functional modules are adhesively sealed behind a copper contact of the SIM card and packaged in a manner the same as a packaging manner of a common IC card. The packaging manner of a common IC card is embedding a microelectronic chip into an international standard-compliant substrate to form a card. After the packaging is completed, the SIM card is inserted into a card connector of a terminal, and a user may insert, remove, or replace the SIM card according to an actual requirement. This type of SIM card is usually made of plastics or common metallic copper. Therefore, a surface of this type of SIM card is liable to deformation at a high temperature. A deformed SIM card affects normal use by a user. A tolerable temperature range for this type of SIM card is: −25° C. to 70° C.

The IC SIM card can tolerate a narrow operating temperature range, and requirements for its application in industrial devices and in-vehicle devices cannot be met. Therefore, chip SIM cards have emerged. In this type of SIM card, five modules of an IC SIM card are packaged inside a chip, so that its reliability is higher and its tolerable temperature range is relatively wider. Normally, the temperature specification is: −40° C. to 85° C.

The IC SIM card and the chip SIM card are consistent in their external pin functions and time sequence requirements, only different in their packaging forms. Main external pins are VCC, RST, IO, CLK, VPP, and GND. A level range is between 1.8 V and 5 V (including 1.8 V and 5V). Currently, most SIM cards have a level of 1.8 V, and have a relatively strict requirement for a power-on time sequence.

A transmission distance of an original signal outputted by a SIM card is short. According to analysis of wiring emulation on a printed circuit board (Printed Circuit Board, PCB), generally, a wiring length for the original signal outputted by the SIM card should not exceed 25 cm. If this distance is exceeded, a problem that the SIM card signal cannot be read may occur probabilistically. Therefore, a SIM card is generally placed directly in a device for use.

However, a SIM card cannot be directly placed in a device in some applications that require the SIM card to be placed far away from the device. For example, (1) in an in-vehicle entertainment system, some types of vehicles require that a SIM card be placed far away from a main communications system of the vehicle; (2) in an industrial communications module, because of a high ambient temperature, a SIM card needs to be kept far away from a terminal device, so as to avoid a failure of the SIM card due to deformation after long-time exposure to a high temperature. Yet if the SIM card is placed far away from the device, the current transmission distance of an original signal outputted by the SIM card cannot satisfy these applications.

Therefore, it is necessary to provide a method to resolve the foregoing problem.

SUMMARY

Embodiments of the present invention provide a subscriber identity module signal conversion method and apparatus, where a generated target signal can be transmitted over a relatively long distance by using a signal transmission line, which can satisfy an application requiring that a SIM card be placed far away from a terminal device.

A SIM card signal conversion method provided by a first aspect of the embodiments of the present invention includes: obtaining an original signal outputted by the SIM card;

converting the original signal into a target signal, where under an equal transmission condition and/or an equal transmission distance, signal attenuation and/or distortion of the target signal are/is less than signal attenuation and/or distortion of the original signal; and sending the target signal to a terminal device, where the terminal device obtains the target signal by using a signal transmission line, and the SIM card exists independent of the terminal device.

With reference to the first aspect of the embodiments of the present invention, in a first implementation manner of the first aspect of the embodiments of the present invention, the original signal includes at least one of the following: a logic gate circuit TTL signal, or a complementary metal-oxide-semiconductor CMOS signal; and the target signal includes at least one of the following: an RS232 signal, or a low-voltage differential signal LVDS signal, or a universal serial bus USB signal.

With reference to the first aspect of the embodiments of the present invention, or the first implementation manner of the first aspect, in a second implementation manner of the first aspect of the embodiments of the present invention, the converting the original signal into a target signal is specifically: converting the original signal into an RS232 signal, including converting the original signal into a universal asynchronous receiver/transmitterUART signal by using a first dedicated conversion chip or by using a field programmable logic gate array FPGA; and converting the UART signal into the RS232 signal by using a second dedicated conversion chip or by using a detachable device; and the sending the target signal to a terminal device is specifically:

sending the RS232 signal to the terminal device.

With reference to the first aspect of the embodiments of the present invention, or the first implementation manner of the first aspect, in a third implementation manner of the first aspect of the embodiments of the present invention, the converting the original signal into a target signal is specifically: converting the original signal into an LVDS signal, including converting the original signal into the LVDS signal by using a third dedicated conversion chip; and the sending the target signal to a terminal device is specifically:

sending the LVDS signal to the terminal device.

With reference to the first aspect of the embodiments of the present invention, or the first implementation manner of the first aspect, in a fourth implementation manner of the first aspect of the embodiments of the present invention, the converting the original signal into a target signal is specifically: converting the original signal into a USB signal, including converting the original signal into the USB signal by using a fourth dedicated conversion chip; and the sending the target signal to a terminal device is specifically:

sending the USB signal to the terminal device.

With reference to the first aspect of the embodiments of the present invention, or the first implementation manner of the first aspect, or the second implementation manner of the first aspect, or the third implementation manner of the first aspect, or the fourth implementation manner of the first aspect, in a fifth implementation manner of the first aspect of the embodiments of the present invention, a requirement of the target signal for material of the signal transmission line, or a geometric structure of the signal transmission line, or technical processing of the signal transmission line is lower than a requirement of the original signal for the material of the signal transmission line, or the geometric structure of the signal transmission line, or the technical processing of the signal transmission line.

With reference to the first aspect of the embodiments of the present invention, or the first implementation manner of the first aspect, or the second implementation manner of the first aspect, or the third implementation manner of the first aspect, or the fourth implementation manner of the first aspect, in a sixth implementation manner of the first aspect of the embodiments of the present invention, the terminal device is a terminal device that has a capability of restoring the original signal from the target signal.

A second aspect of the embodiments of the present invention provides a signal conversion apparatus, where the signal conversion apparatus includes an obtaining module, configured to obtain an original signal outputted by a subscriber identity module SIM card;

a conversion module, configured to convert the original signal into a target signal, where under an equal transmission condition and/or an equal transmission distance, signal attenuation and/or distortion of the target signal are/is less than signal attenuation and/or distortion of the original signal; and a sending module, configured to send the target signal to a terminal device, where the terminal device obtains the target signal by using a signal transmission line, and the SIM card exists independent of the terminal device.

With reference to the second aspect of the embodiments of the present invention, in a first implementation manner of the second aspect of the embodiments of the present invention, the original signal includes at least one of the following: a logic gate circuit TTL signal, or a complementary metal-oxide-semiconductor CMOS signal; and the target signal includes at least one of the following: an RS232 signal, or a low-voltage differential signal LVDS signal, or a universal serial bus USB signal.

With reference to the second aspect of the embodiments of the present invention, or the first implementation manner of the second aspect, in a second implementation manner of the second aspect of the embodiments of the present invention, the conversion module includes:

a first conversion submodule, configured to convert the original signal into a universal asynchronous receiver/transmitter UART signal by using a first dedicated conversion chip or by using a field programmable logic gate array FPGA; and a second conversion submodule, configured to convert the UART signal into the RS232 signal by using a second dedicated conversion chip or by using a detachable device; and the sending module includes:

a first sending submodule, configured to send the RS232 signal to the terminal device.

With reference to the second aspect of the embodiments of the present invention, or the first implementation manner of the second aspect, in a third implementation manner of the second aspect of the embodiments of the present invention, the conversion module includes: a third conversion submodule, configured to convert the original signal into an LVDS signal by using a third dedicated conversion chip; and the sending module includes:

a second sending submodule, configured to send the LVDS signal to the terminal device.

With reference to the second aspect of the embodiments of the present invention, or the first implementation manner of the second aspect, in a fourth implementation manner of the second aspect of the embodiments of the present invention, the conversion module includes: a fourth conversion submodule, configured to convert the original signal into a USB signal by using a fourth dedicated conversion chip; and the sending module includes:

a third sending submodule, configured to send the USB signal to the terminal device.

With reference to the second aspect of the embodiments of the present invention, or the first implementation manner of the second aspect, or the second implementation manner of the second aspect, or the third implementation manner of the second aspect, or the fourth implementation manner of the second aspect, in a fifth implementation manner of the second aspect of the embodiments of the present invention, a requirement of the target signal for material of the signal transmission line, or a geometric structure of the signal transmission line, or technical processing of the signal transmission line is lower than a requirement of the original signal for the material of the signal transmission line, or the geometric structure of the signal transmission line, or the technical processing of the signal transmission line.

With reference to the second aspect of the embodiments of the present invention, or the first implementation manner of the second aspect, or the second implementation manner of the second aspect, or the third implementation manner of the second aspect, or the fourth implementation manner of the second aspect, in a sixth implementation manner of the second aspect of the embodiments of the present invention, the terminal device is a terminal device that has a capability of restoring the original signal from the target signal.

It can be seen from the foregoing technical solutions that the embodiments of the present invention have the following advantages:

In the embodiments of the present invention, a SIM card exits independent of a terminal device, and a signal conversion apparatus obtains an original signal outputted by the SIM card, and converts the original signal into a target signal. Interference immunity performance of the target signal is better than interference immunity performance of the original signal outputted by the SIM card, or transmission power consumption of the target signal is less than transmission power consumption of the original signal outputted by the SIM card, or the target signal can adapt to a more complicated and more adverse transmission environment. Therefore, under an equal transmission condition and/or an equal transmission distance, signal attenuation and/or distortion of the target signal are/is less than signal attenuation and/or distortion of the original signal, and the target signal can be transmitted over a longer distance by using a signal transmission line. Therefore, the target signal can satisfy an application requiring that a SIM card be placed far away from a terminal device.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention provide a SIM card signal conversion method and a signal conversion apparatus, which can satisfy an application requiring that a SIM card be placed far away from a terminal device.

Figure 1:
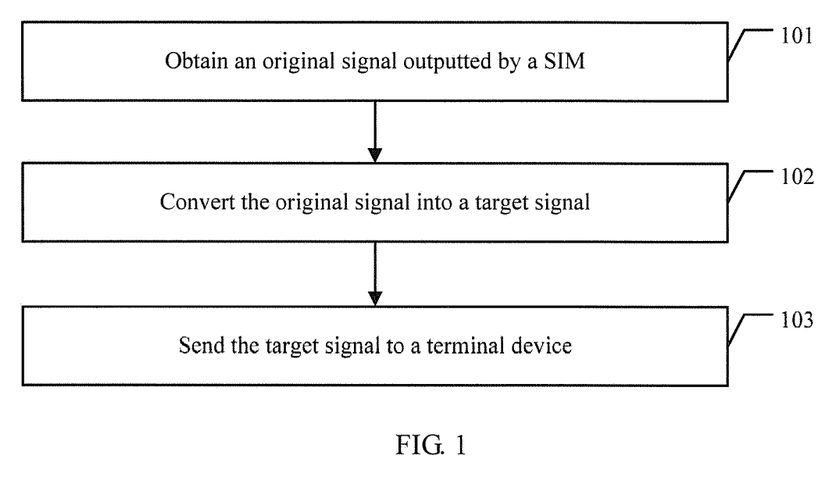
FIG. 1 is a schematic diagram of a SIM card signal conversion method according to an embodiment of the present invention.

FIG. 1 is a schematic diagram of a SIM card signal conversion method according to an embodiment of the present invention. Referring to FIG. 1, the SIM card signal conversion method in the embodiment of the present invention includes:

101: Obtain an original signal outputted by a SIM card.

In the embodiment of the present invention, the original signal outputted by the SIM card may be: a logic gate circuit (Transistor-Transistor Logic, TTL) signal, or a complementary metal-oxide-semiconductor (Complementary Metal Oxide Semiconductor, CMOS) signal, or a common level signal of another type. A main difference between these signals lies in a high- or low-level value. Therefore, it is very easy to perform mutual conversion between these signals. A signal conversion apparatus obtains the original signal outputted by the SIM card.

102: Convert the original signal into a target signal.

Generally, the original signal outputted by the SIM card can be transmitted only over a relatively short distance (tens of centimeters). Therefore, in normal cases, the SIM card is inserted into a card slot, and the card slot is directly disposed in a terminal device. As a result, the transmission distance of the original signal outputted by the SIM card cannot satisfy an application that requires a SIM card to be placed far away from a terminal device.

In the embodiment of the present invention, the SIM card may be separated from the terminal device, that is, the SIM card exists independent of the terminal device. A signal transmission line may be used for both a connection between the SIM card and the signal conversion apparatus and that between the signal conversion apparatus and the terminal device.

After obtaining the original signal outputted by the SIM card, the signal conversion apparatus converts the original signal outputted by the SIM card into the target signal. The target signal may be an RS232 signal, or a universal serial bus (Universal Serial BUS, USB) signal, or a low-voltage differential signal (Low-Voltage Differential Signaling, LVDS).

Specifically, which type of target signal the signal conversion apparatus needs to convert the original signal into may be determined according to a port of the terminal device. For example, if the port of the terminal device is capable of recognizing an RS232 signal, and the terminal device has a capability of restoring the original signal from an RS232 signal, the signal conversion apparatus coverts the original signal into an RS232 signal. If the terminal device has a USB port, the signal conversion apparatus converts the original signal into a USB signal. If the port of the terminal device is capable of recognizing an LVDS signal, and the terminal device has a capability of restoring the original signal from an LVDS signal, the signal conversion apparatus converts the original signal into an LVDS signal.

Under an equal transmission condition and/or at an equal transmission distance, signal attenuation and/or distortion of the target signal are/is less than signal attenuation and/or distortion of the original signal. The equal transmission condition herein mainly refers to a same temperature and same transmission interference.

103: Send the target signal to a terminal device.

The terminal device may be specifically a mobile terminal device such as a mobile phone and a tablet computer (PAD).

After converting the original signal outputted by the SIM card into the target signal, the signal conversion apparatus sends the target signal to the terminal device by using a signal transmission line. Because under an equal transmission condition and/or at an equal transmission distance, signal attenuation and/or distortion of the target signal are/is less than signal attenuation and/or distortion of the original signal, the target signal can be transmitted over a longer distance.

Specifically, for example, the target signal is an RS232 signal. A maximum transmission distance of the RS232 signal can reach 15 meters, while the original signal outputted by the SIM card, such as a TTL signal, can be transmitted only over a maximum of tens of centimeters. A transmission distance of the RS232 signal is far longer than a transmission distance of the original signal, and the RS232 signal can resist strong environment interference and can adapt to a more complicated and more adverse transmission condition. Alternatively, the target signal is an LVDS signal. A transmission distance of the LVDS signal can reach tens of meters, which is far longer than tens of centimeters, namely, the maximum transmission distance of the original signal outputted by the SIM card. In addition, the LVDS signal is characterized by a small amplitude and a capability of being outputted using a low-voltage-swing and low-current driver, and can minimize power consumption and noise. If the target signal is a USB signal, a maximum transmission distance of the USB signal is 5 meters. If a USB signal amplifier line with a chip amplifier included inside is used to transmit the USB signal, the USB signal can be transmitted over a longer distance. Moreover, interference immunity performance of the USB signal is also better than that of the original signal outputted by the SIM card.

In the embodiment of the present invention, a SIM card may be separated from a terminal device, and a signal transmission line may be used for both a connection between the SIM card and a signal conversion apparatus and that between the signal conversion apparatus and the terminal device. The signal conversion apparatus obtains an original signal outputted by the SIM card, and converts the original signal into a target signal. Interference immunity performance of the target signal is better than interference immunity performance of the original signal outputted by the SIM card, or transmission power consumption of the target signal is less than transmission power consumption of the original signal outputted by the SIM card, or the target signal can adapt to a more complicated and more adverse transmission environment. Therefore, under an equal transmission condition and/or at an equal transmission distance, signal attenuation and/or distortion of the target signal are/is less than signal attenuation and/or distortion of the original signal, and the target signal can be transmitted over a longer distance. Therefore, the target signal can satisfy an application that requires a SIM card to be placed far away from a terminal device.

Figure 2:
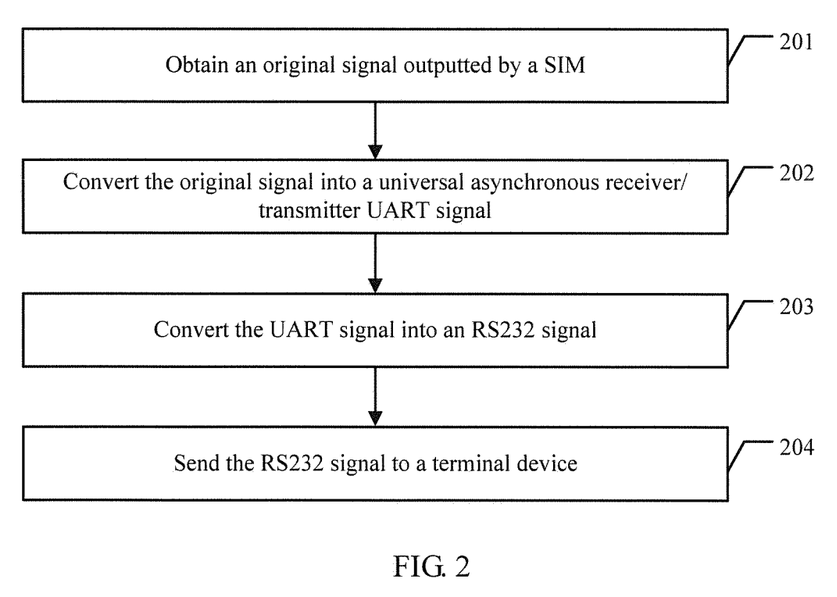
FIG. 2 is a schematic diagram of a SIM card signal conversion method according to another embodiment of the present invention.

For better understanding, the following describes the SIM card signal conversion method in the embodiment of the present invention by using a specific embodiment. The following mainly describes a process in which an original signal outputted by a SIM card is converted into a target signal, an RS232 signal. FIG. 2 is a schematic diagram of the SIM card signal conversion method according to another embodiment of the present invention. As shown in FIG. 2, the SIM card signal conversion method in the another embodiment of the present invention includes:

201: Obtain an original signal outputted by a SIM card.

Generally, a transmission distance of the original signal outputted by the SIM card is relatively short. Therefore, in normal cases, the SIM card is inserted into a card slot, and the card slot is directly disposed in a terminal device. As a result, the transmission distance of the original signal outputted by the SIM card cannot satisfy an application that requires a SIM card to be placed far away from a terminal device.

In the embodiment of the present invention, the SIM card may be separated from the terminal device, that is, the SIM card exists independent of the terminal device. A signal transmission line may be used for both a connection between the SIM card and a signal conversion apparatus and that between the signal conversion apparatus and the terminal device. The signal conversion apparatus first obtains the original signal outputted by the SIM card.

202: Convert the original signal outputted by the SIM card into a universal asynchronous receiver/transmitter UART signal.

Because different types of chips are used in SIM card making, types of original signals outputted by the SIM card are possibly also different. For example, the original signal outputted by the SIM card may be a TTL signal, or a CMOS signal, or a common level signal of another type. A difference between these signals mainly lies in a high or low level value.

Therefore, different types of original signals outputted by the SIM card may be mutually converted, and a conversion method is relatively simple. For example, conversion between a TTL signal and a CMOS signal may be implemented by simply using two resistors to perform level voltage division. Therefore, in the embodiment of the present invention, whatever type of original signal is outputted by the SIM card, the signal conversion apparatus may first convert a different original signal outputted by the SIM card into a uniform signal of a given type, such as a TTL signal, and then convert the uniform signal into a universal asynchronous receiver/transmitter (Universal Asynchronous Receiver/Transmitter, UART) signal by using a first dedicated conversion chip such as TDA8029, or by using a field programmable logic gate array (Field-Programmable Gate Array, FPGA).

The UART signal has an error detection and correction capability, and its requirements for a transmission time sequence, material of a signal transmission line, a geometric structure of the signal transmission line, and technical processing of the signal transmission line are all lower than requirements of the original signal outputted by the SIM card for the transmission time sequence, the material of the signal transmission line, the geometric structure of the signal transmission line, and the technical processing of the signal transmission line.

However, a transmission distance of the UART signal is still not long enough, and therefore driver enhancement processing may be performed for the UART signal.

203: Convert the UART signal into an RS232 signal.

The signal conversion apparatus performs driver enhancement processing for the UART signal by using a second dedicated conversion chip, such as MAX3228, or by using a detachable device to convert the UART signal into the RS232 signal.

The RS232 signal has a higher level amplitude and stronger interference immunity, and therefore signal transmission attenuation and distortion are smaller. In addition, a maximum transmission distance of the RS232 signal can reach 15 meters, while a maximum transmission distance of the original signal outputted by the SIM card is only tens of centimeters. In the embodiment of the present invention, a transmission distance is greatly increased. This helps to separate the SIM card from the terminal device, so that the SIM card exists independent of the terminal device, meeting an application requirement that the SIM card be separated from the terminal device.

204: Send the RS232 signal to a terminal device.

A signal conversion apparatus sends the RS232 signal to the terminal device by using a signal transmission line. The original signal outputted by the SIM card has been converted into the RS232 signal. Therefore the terminal device that receives the RS232 signal needs to have a signal restoration function, capable of restoring the original signal outputted by the SIM card from the RS232 signal, so that the terminal device can use the RS232 signal sent by the signal conversion apparatus.

In the embodiment of the present invention, a SIM card may be separated from a terminal device, and a signal transmission line may be used for both a connection between the SIM card and a signal conversion apparatus and that between the signal conversion apparatus and the terminal device. The signal conversion apparatus obtains an original signal outputted by the SIM card, and converts the original signal into a UART signal. The UART signal has an error detection and correction capability, and its requirements for a transmission time sequence and a transmission condition are all lower than those of the original signal outputted by the SIM card. After converting the original signal into the UART signal, the signal conversion apparatus then performs driver enhancement processing for the UART signal to convert the UART signal into an RS232 signal. The RS232 signal has a higher level amplitude and stronger interference immunity, and can adapt to a more complicated and more adverse transmission condition. Therefore, the RS232 signal can be transmitted over a longer distance. A maximum transmission distance of the RS232 signal can reach 15 meters. The signal conversion apparatus sends the RS232 signal to the terminal device by using a signal transmission line. Therefore, the target signal RS232 signal can satisfy an application that requires a SIM card to be placed far away from a terminal device, and its requirement for a transmission environment is lower than a requirement of the original signal for a transmission environment.

Figure 3:
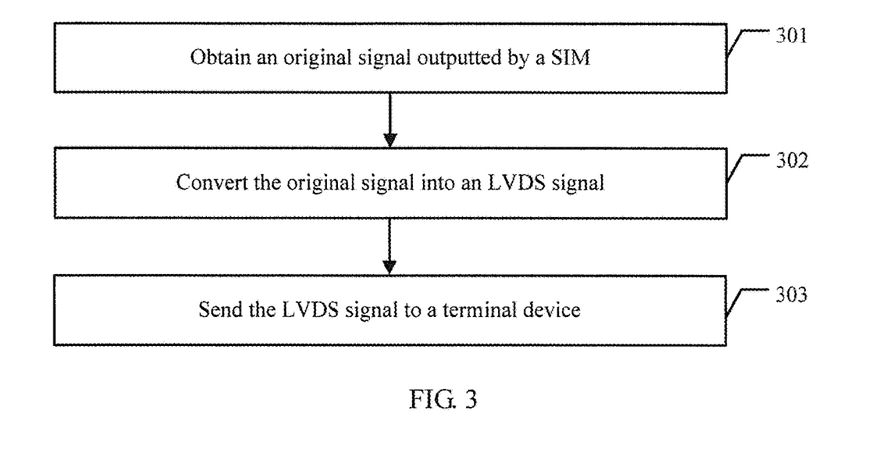
FIG. 3 is a schematic diagram of a SIM card signal conversion method according to another embodiment of the present invention.

For better understanding, the following describes the SIM card signal conversion method in the embodiment of the present invention by using another specific embodiment. The following mainly describes a process in which an original signal outputted by a SIM card is converted into a target signal, a lower voltage differential signal (Low-Voltage Differential Signaling, LVDS). FIG. 3 is a schematic diagram of the SIM card signal conversion method according to another embodiment of the present invention. As shown in FIG. 3, the SIM card signal conversion method in the another embodiment of the present invention includes:

301: Obtain an original signal outputted by a SIM card.

A transmission distance of the original signal outputted by the SIM card is relatively short. Therefore, in normal cases, the SIM card is inserted into a card slot, and the card slot is directly disposed in a terminal device. As a result, the transmission distance of the original signal outputted by the SIM card cannot satisfy an application that requires a SIM card to be placed far away from a terminal device.

In the embodiment of the present invention, the SIM card may be separated from the terminal device, that is, the SIM card exists independent of the terminal device. A signal transmission line may be used for both a connection between the SIM card and a signal conversion apparatus and that between the signal conversion apparatus and the terminal device. The signal conversion apparatus first obtains the original signal outputted by the SIM card.

302: Convert the original signal into an LVDS signal.

Because different types of chips are used in SIM card making, types of original signals outputted by the SIM card are possibly also different. For example, the original signal outputted by the SIM card may be a TTL signal, or a CMOS signal, or a common level signal of another type. A difference between these signals mainly lies in a high or low level value.

Therefore, different types of original signals outputted by the SIM card may be mutually converted, and a conversion method is relatively simple. For example, conversion between a TTL signal and a CMOS signal may be implemented by simply using two resistors to perform level voltage division. Therefore, in the embodiment of the present invention, whatever type of original signal is outputted by the SIM card, the signal conversion apparatus may first convert a different original signal outputted by the SIM card into a uniform signal of a given type, such as a TTL signal, and then convert the uniform signal into the LVDS signal by using a fourth dedicated conversion chip.

A standard transmission distance of the LVDS signal can reach tens of meters, which is far longer than tens of centimeters, a maximum transmission distance of the original signal outputted by the SIM card. This helps to separate the SIM card from the terminal device, so that the SIM card exists independent of the terminal device, meeting an application requirement that the SIM card be separated from the terminal device. In addition, the LVDS signal is characterized by a small amplitude and a capability of being outputted using a low-voltage-swing and low-current driver, and can minimize power consumption and noise. Signal attenuation during a signal transmission process is smaller.

303: Send the LVDS signal to a terminal device.

After converting the original signal into the LVDS signal, a signal conversion apparatus sends the LVDS signal to the terminal device by using a signal transmission line. The terminal device needs to have a function of restoring the original signal from the LVDS signal, so that the terminal device can use the LVDS signal sent by the signal conversion apparatus.

In the embodiment of the present invention, a SIM card may be separated from a terminal device, and a signal transmission line may be used for both a connection between the SIM card and a signal conversion apparatus and that between the signal conversion apparatus and the terminal device. The signal conversion apparatus obtains an original signal outputted by the SIM card, converts the original signal into an LVDS signal, and sends the LVDS signal to the terminal device by using a signal transmission line. A maximum transmission distance of the LVDS signal can reach tens of meters, which is far longer than a maximum transmission distance of the original signal outputted by the SIM card. In addition, the LVDS signal is characterized by a small amplitude and a capability of being outputted using a low-voltage-swing and low-current driver, and can minimize power consumption and noise. Signal attenuation during a signal transmission process is smaller. Therefore, the target signal LVDS signal can satisfy an application that requires a SIM card to be placed far away from a terminal device.

Figure 4:
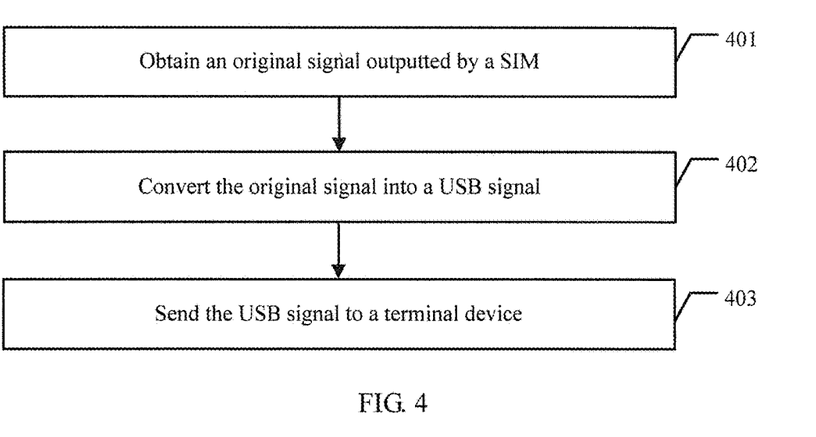
FIG. 4 is a schematic diagram of a SIM card signal conversion method according to another embodiment of the present invention.

For better understanding, the following describes the SIM card signal conversion method in the embodiment of the present invention by using another specific embodiment. The following mainly describes a process in which an original signal outputted by the SIM card is converted into a target signal, a universal serial bus (Universal Serial BUS, USB) signal. FIG. 4 is a schematic diagram of the SIM card signal conversion method according to another embodiment of the present invention. As shown in FIG. 4, the SIM card signal conversion method in the another embodiment of the present invention includes:

401: Obtain an original signal outputted by a SIM card.

A transmission distance of the original signal outputted by the SIM card is relatively short. Therefore, in normal cases, the SIM card is inserted into a card slot, and the card slot is directly disposed in a terminal device. As a result, the transmission distance of the original signal outputted by the SIM card cannot satisfy an application that requires a SIM card to be placed far away from a terminal device.

In the embodiment of the present invention, the SIM card may be separated from the terminal device, that is, the SIM card exists independent of the terminal device. A signal transmission line may be used for both a connection between the SIM card and a signal conversion apparatus and that between the signal conversion apparatus and the terminal device. The signal conversion apparatus first obtains the original signal outputted by the SIM card.

402: Convert the original signal into a USB signal.

Because different types of chips are used in SIM card making, types of original signals outputted by the SIM card are possibly also different. For example, the original signal outputted by the SIM card may be a TTL signal, or a CMOS signal, or a common level signal of another type. A difference between these signals mainly lies in a high or low level value.

Therefore, different types of original signals outputted by the SIM card may be mutually converted, and a conversion method is relatively simple. For example, conversion between a TTL signal and a CMOS signal may be implemented by simply using two resistors to perform level voltage division. Therefore, in the embodiment of the present invention, whatever type of original signal is outputted by the SIM card, the signal conversion apparatus may first convert a different original signal outputted by the SIM card into a uniform signal of a given type, such as the TTL signal, and then convert the uniform signal into the USB signal by using a third dedicated conversion chip, such as a CP2102 chip.

In a case in which the USB signal is not amplified, a maximum transmission distance is 5 meters, which is longer than tens of centimeters, a maximum transmission distance of the original signal outputted by the SIM card. If a USB signal amplifier line with a chip amplifier included inside is used to transmit the USB signal, the USB signal can be transmitted over a longer distance. This helps to separate the SIM card from the terminal device, so that the SIM card exists independent of the terminal device, meeting an application requirement that the SIM card be separated from the terminal device. In addition, the USB signal has stronger interference immunity; therefore signal transmission attenuation and distortion are smaller.

403: Send the USB signal to a terminal device.

A signal conversion apparatus sends the USB signal to the terminal device by using a signal transmission line.

Specifically, after converting the original signal into the USB signal, the signal conversion apparatus may send the USB signal to the terminal device by using a USB signal amplifier line with a chip amplifier included inside. The terminal device needs to have a USB port, which is capable of recognizing the USB signal sent by the signal conversion apparatus.

In the embodiment of the present invention, a SIM card may be separated from a terminal device, and a signal transmission line may be used for both a connection between the SIM card and a signal conversion apparatus and that between the signal conversion apparatus and the terminal device. The signal conversion apparatus obtains an original signal outputted by the SIM card, converts the original signal into a USB signal, and sends the USB signal to the terminal device. Interference immunity performance of the USB signal is better than that of a TTL signal, a CMOS signal, or the like outputted by the SIM card. Therefore, attenuation and distortion of the USB signal are smaller during a signal transmission process. A maximum transmission distance of the USB signal can reach 5 meters, which is longer than tens of centimeters, a maximum transmission distance of the original signal outputted by the SIM card. Therefore, the target signal USB signal can satisfy an application that requires a SIM card to be placed far away from a terminal device.

Figure 5:
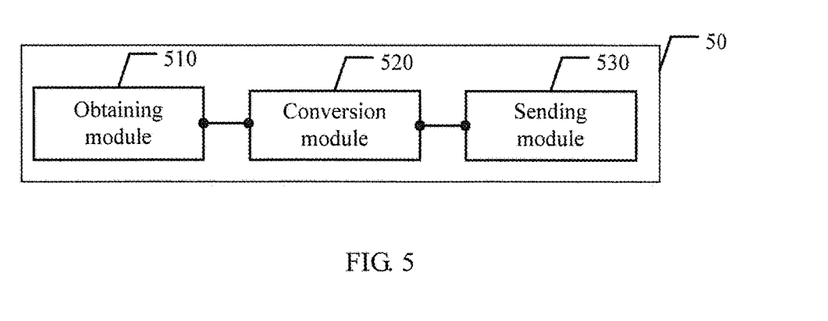
FIG. 5 is a schematic diagram of a signal conversion apparatus according to an embodiment of the present invention.

The following describes a signal conversion apparatus in an embodiment of the present invention. FIG. 5 is a schematic diagram of the signal conversion apparatus according to the embodiment of the present invention. As shown in FIG. 5, the signal conversion apparatus 50 in the embodiment of the present invention includes:

an obtaining module 510, configured to obtain an original signal outputted by a SIM card;

a conversion module 520, configured to convert the original signal into a target signal, where under an equal transmission condition and an equal transmission distance, signal attenuation and/or distortion of the target signal are/is less than signal attenuation and/or distortion of the original signal; and a sending module 530, configured to send the target signal to a terminal device, where the terminal device obtains the target signal by using a signal transmission line, and the SIM card exists independent of the terminal device.

For better understanding, the following describes an interaction manner between the modules of the signal conversion apparatus in the embodiment of the present invention by using an actual application scenario. Details are as follows:

Generally, a transmission distance of an original signal outputted by a SIM card is relatively short. Therefore, in normal cases, the SIM card is inserted into a card slot, and the card slot is directly disposed in a terminal device. As a result, the transmission distance of the original signal outputted by the SIM card cannot satisfy an application that requires a SIM card to be placed far away from a terminal device.

In the embodiment of the present invention, the SIM card may be separated from the terminal device, that is, the SIM card exists independent of the terminal device. A signal transmission line may be used for both a connection between the SIM card and the signal conversion apparatus and that between the signal conversion apparatus and the terminal device. The obtaining module 510 of the signal conversion apparatus first obtains the original signal outputted by the SIM card.

In the embodiment of the present invention, the original signal outputted by the SIM card may be a TTL signal, or a CMOS signal, or a common level signal of another type. A maximum transmission distance of these signals is only tens of centimeters. A difference between these signals mainly lies in a high or low level value. Therefore, it is very easy to perform mutual conversion between these signals.

The conversion module 520 obtains the original signal outputted by the SIM card, and converts the original signal into the target signal, where the target signal may be an RS232 signal, or an LVDS signal, or a USB signal.

Specifically, which type of target signal the conversion module 520 needs to convert the original signal into may be determined according to a port of the terminal device. For example, if the port of the terminal device is capable of recognizing an RS232 signal, and the terminal device has a capability of restoring the original signal from an RS232 signal, the conversion module 520 converts the original signal into an RS232 signal. If the port of the terminal device is capable of recognizing an LVDS signal, and the terminal device has a capability of restoring the original signal from an LVDS signal, the conversion module 520 converts the original signal into an LVDS signal. If the terminal device has a USB port, the conversion module 520 converts the original signal into a USB signal.

The terminal device may be specifically a mobile terminal device such as a mobile phone and a PAD.

Under an equal transmission condition and/or at an equal transmission distance, signal attenuation and/or distortion of the target signal are/is less than signal attenuation and/or distortion of the original signal. The equal transmission condition herein mainly refers to a same temperature and same transmission interference.

The sending module 530 sends the target signal obtained by conversion by the conversion module 520 to the terminal device by using the signal transmission line. Because under an equal transmission condition and/or at an equal transmission distance, signal attenuation and/or distortion of the target signal are/is less than signal attenuation and/or distortion of the original signal, the target signal can be transmitted over a longer distance.

Specifically, for example, the target signal is an RS232 signal. A maximum transmission distance of the RS232 signal can reach 15 meters, while the original signal outputted by the SIM card, such as a TTL signal, can be transmitted only over a maximum of tens of centimeters. A transmission distance of the RS232 signal is far longer than a transmission distance of the original signal, and the RS232 signal can resist strong environment interference and can adapt to a more complicated and more adverse transmission condition. Alternatively, the target signal is an LVDS signal. A transmission distance of the LVDS signal can reach tens of meters, which is far longer than tens of centimeters, namely, the maximum transmission distance of the original signal outputted by the SIM card. In addition, the LVDS signal is characterized by a small amplitude and a capability of being outputted using a low-voltage-swing and low-current driver, and can minimize power consumption and noise. If the target signal is a USB signal, a maximum transmission distance of the USB signal is 5 meters. If a USB signal amplifier line with a chip amplifier included inside is used to transmit the USB signal, the USB signal can be transmitted over a longer distance. Moreover, interference immunity performance of the USB signal is also better than that of the original signal outputted by the SIM card.

In the embodiment of the present invention, a SIM card may be separated from a terminal device, and a signal transmission line may be used for both a connection between the SIM card and a signal conversion apparatus and that between the signal conversion apparatus and the terminal device. After an obtaining module obtains an original signal outputted by the SIM card, a conversion module of the signal conversion apparatus converts the original signal into a target signal. Interference immunity performance of the target signal is better than interference immunity performance of the original signal outputted by the SIM card, or transmission power consumption of the target signal is less than transmission power consumption of the original signal outputted by the SIM card, or the target signal can adapt to a more complicated and more adverse transmission environment. Therefore, under an equal transmission condition and/or at an equal transmission distance, signal attenuation and/or distortion of the target signal are/is less than signal attenuation and/or distortion of the original signal, that is, the target signal can be transmitted over a longer distance. Therefore, the target signal can satisfy an application that requires a SIM card to be placed far away from a terminal device.

Figure 6:
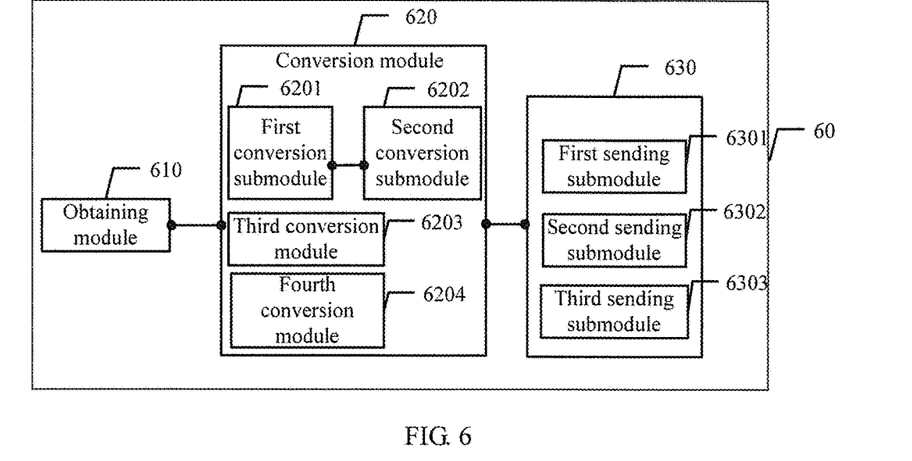
FIG. 6 is a schematic diagram of a signal conversion apparatus according to another embodiment of the present invention.

For better understanding, the following describes the signal conversion apparatus in the embodiment of the present invention by using a specific embodiment. FIG. 6 is a schematic diagram of the signal conversion apparatus according to another embodiment of the present invention. As shown in FIG. 6, the signal conversion apparatus 60 in the another embodiment of the present invention includes:

an obtaining module 610, configured to obtain an original signal outputted by a SIM card;

a conversion module 620, configured to convert the original signal into a target signal, where under an equal transmission condition and an equal transmission distance, signal attenuation and/or distortion of the target signal are/is less than signal attenuation and/or distortion of the original signal; and a sending module 630, configured to send the target signal to a terminal device, where the terminal device obtains the target signal by using a signal transmission line, and the SIM card exists independent of the terminal device.

The conversion module 620 may include a first conversion submodule 6201 and a second conversion submodule 6202, where:

the first conversion submodule 6201 is configured to convert the original signal obtained by the obtaining module 610 into a universal asynchronous receiver/transmitter UART signal by using a first dedicated conversion chip or by using a programmable gate array FPGA; and the second conversion submodule 6202 is configured to convert the UART signal into an RS232 signal by using a second dedicated conversion chip or by using a detachable device.

Correspondingly, the sending module 630 sends the RS232 signal to the terminal device by using a first sending submodule 6301 of the sending module 630.

The conversion module 620 may further include a third conversion submodule 6203, where the third conversion submodule 6203 is configured to convert the original signal into an LVDS signal by using a third dedicated conversion chip.

Correspondingly, the sending module 630 sends the LVDS signal to the terminal device by using a second sending submodule 6302 of the sending module 630.

In addition, the conversion module 620 may further include a fourth conversion submodule 6204, where the fourth conversion submodule 6024 is configured to convert the original signal into a USB signal by using a fourth dedicated conversion chip.

Correspondingly, the sending module 630 sends the USB signal to the terminal device by using a third sending submodule 6303 of the sending module 630.

For better understanding, the following describes an interaction manner between the modules of the signal conversion apparatus in the embodiment of the present invention by using an actual application scenario. Details are as follows:

A transmission distance of an original signal outputted by a SIM card is relatively short. Therefore, in normal cases, the SIM card is inserted into a card slot, and the card slot is directly disposed in a terminal device. As a result, the transmission distance of the original signal outputted by the SIM card cannot satisfy an application that requires a SIM card to be placed far away from a terminal device.

In the embodiment of the present invention, the SIM card may be separated from the terminal device, that is, the SIM card exists independent of the terminal device. A signal transmission line may be used for both a connection between the SIM card and a signal conversion apparatus and that between the signal conversion apparatus and the terminal device. The obtaining module 610 of the signal conversion apparatus first obtains the original signal outputted by the SIM card.

Because different types of chips are used in SIM card making, types of original signals outputted by the SIM card are possibly also different. For example, the original signal outputted by the SIM card may be a TTL signal, or a CMOS signal, or a common level signal of another type. These signals are different mainly in a high or low level value.

Therefore, different types of original signals outputted by the SIM card may be mutually converted, and a conversion method is relatively simple. For example, conversion between a TTL signal and a CMOS signal may be implemented by simply using two resistors to perform level voltage division. Therefore, in the embodiment of the present invention, whatever type of original signal is outputted by the SIM card, the conversion module 620 may first convert a different original signal outputted by the SIM card into a uniform signal of a given type, such as a TTL signal, and then convert the uniform signal into the target signal.

A specific conversion method may be as follows:

First manner:

The first conversion submodule 6201 converts the uniform signal into the universal asynchronous receiver/transmitter UART signal by using the first dedicated conversion chip such as TDA8029, or by using the field programmable logic gate array FPGA.

The UART signal has an error detection and correction capability, and its requirements for a transmission time sequence, material of a signal transmission line, a geometric structure of the signal transmission line, and technical processing of the signal transmission line are all lower than requirements of the original signal outputted by the SIM card for the transmission time sequence, the material of the signal transmission line, the geometric structure of the signal transmission line, and the technical processing of the signal transmission line.

However, a transmission distance of the UART signal is still not long enough, and therefore driver enhancement processing may be performed for the UART signal.

The second conversion submodule 6202 converts the UART signal obtained by conversion by the first conversion submodule 6201 into the RS232 signal by using the second dedicated conversion chip such as MAX3228.

The RS232 signal has a higher level amplitude and stronger interference immunity, and therefore signal transmission attenuation and distortion are smaller. In addition, a maximum transmission distance of the RS232 signal can reach 15 meters, while a maximum transmission distance of the original signal outputted by the SIM card is only tens of centimeters. In the embodiment of the present invention, a transmission distance is greatly increased.

Second manner:

The third conversion submodule 6203 converts the uniform signal into the LVDS signal by using the third dedicated conversion chip.

A standard transmission distance of the LVDS signal can reach tens of meters, which is far longer than tens of centimeters, a maximum transmission distance of the original signal outputted by the SIM card.

Third manner:

The fourth conversion submodule 6204 converts the uniform signal into the USB signal by using the fourth dedicated conversion chip such as a CP2102 chip.

In a case in which the USB signal is not amplified, a maximum transmission distance is 5 meters, which is longer than tens of centimeters, a maximum transmission distance of the original signal outputted by the SIM card. If a USB signal amplifier line with a chip amplifier included inside is used to transmit the USB signal, the USB signal can be transmitted over a longer distance. Moreover, the USB signal has stronger interference immunity, and therefore signal transmission attenuation and distortion are smaller.

Which manner of the foregoing three manners is specifically used in practice may be determined according to a port type of the terminal device. For example, if the port of the terminal device is capable of recognizing an RS232 signal, and the terminal device has a capability of restoring the original signal from an RS232 signal, the first conversion module 6201 and the second conversion submodule 6202 convert the original signal into an RS232 signal. If the port of the terminal device is capable of recognizing an LVDS signal, and the terminal device has a capability of restoring the original signal from an LVDS signal, the third conversion module 6024 converts the original signal into an LVDS signal. If the terminal device has a USB port, the fourth conversion module 6203 converts the original signal into a USB signal.

The terminal device may be specifically a mobile terminal device such as a mobile phone and a PAD.

Correspondingly, the first sending module 6301 sends the RS232signal obtained by conversion by the second conversion submodule 6202 to the terminal device.

The second sending submodule 6302 sends the LVDS signal obtained by conversion by the third conversion submodule 6203 to the terminal device.

The third sending submodule 6303 sends the USB signal obtained by conversion by the fourth conversion submodule 6204 to the terminal device.

In the embodiment of the present invention, a SIM card may be separated from a terminal device, and a signal transmission line may be used for both a connection between the SIM card and a signal conversion apparatus and that between the signal conversion apparatus and the terminal device. An obtaining module of the signal conversion apparatus obtains an original signal outputted by the SIM card, and each conversion submodule inside a conversion module converts the original signal into a different type of target signal, such as an RS232 signal, an LVDS signal, or a USB signal. Interference immunity performance of the target signal is better than interference immunity performance of the original signal outputted by the SIM card, or transmission power consumption of the target signal is less than transmission power consumption of the original signal outputted by the SIM card, or the target signal can adapt to a more complicated and more adverse transmission environment. Therefore, under an equal transmission condition and/or at an equal transmission distance, signal attenuation and/or distortion of the target signal are/is less than signal attenuation and/or distortion of the original signal, and the target signal can be transmitted over a longer distance.

Therefore, the target signal can satisfy an application that requires a SIM card to be placed far away from a terminal device.

Figure 7:
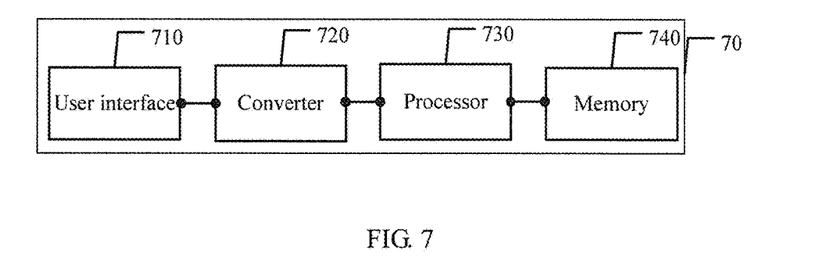
FIG. 7 is a schematic diagram of a signal conversion apparatus according to another embodiment of the present invention.

The following further describes the signal conversion apparatus in the embodiment of the present invention. FIG. 7 is a schematic diagram of the signal conversion apparatus according to another embodiment of the present invention. As shown in FIG. 7, the signal conversion apparatus 70 in the another embodiment of the present invention includes a user interface 710, a converter 720, a processor 730 configured to process a signal, and a memory 740 configured to store cache code.

The user interface 710 executes the following process:
obtaining an original signal outputted by a SIM card; and
sending a target signal to a terminal device, where the terminal device obtains the target signal by using a signal transmission line, and the SIM card exists independent of the terminal device.

The converter 720 executes the following process:
converting the original signal into the target signal, where under an equal transmission condition and/or at an equal transmission distance, signal attenuation and/or distortion of the target signal are/is less than signal attenuation and/or distortion of the original signal.

The original signal includes at least one of the following: a logic circuit TTL signal, or a complementary metal-oxide-semiconductor CMOS signal.

The target signal includes at least one of the following: an RS232 signal, or a low-voltage differential signal LVDS signal, or a universal serial bus USB signal.

Specifically, the converter 720 may include a first dedicated conversion chip or the converter may include a field programmable logic gate array FPGA, to convert the original signal into a universal asynchronous receiver/transmitter UART signal. The converter may further include a second dedicated conversion chip or a detachable device to convert the UART signal into an RS232 signal and send the RS232 signal to the terminal device.

Alternatively, the converter 720 may be a third dedicated conversion chip to convert the original signal into an LVDS signal and send the LVDS signal to the terminal device.

Alternatively, the converter 720 may be a fourth dedicated conversion chip to convert the original signal into a USB signal and send the USB signal to the terminal device.

In the embodiment of the present invention, a SIM card may be separated from a terminal device, and a signal transmission line may be used for both a connection between the SIM card and a signal conversion apparatus and that between the signal conversion apparatus and the terminal device. A user interface of the signal conversion apparatus obtains an original signal outputted by the SIM card, and a convertor converts the original signal into a different type of target signal, such as an RS232 signal, or an LVDS signal, or a USB signal. Interference immunity performance of the target signal is better than interference immunity performance of the original signal outputted by the SIM card, or transmission power consumption of the target signal is less than transmission power consumption of the original signal outputted by the SIM card, or the target signal can adapt to a more complicated and more adverse transmission environment. Therefore, under an equal transmission condition and/or at an equal transmission distance, signal attenuation and/or distortion of the target signal are/is less than signal attenuation and/or distortion of the original signal, and the target signal can be transmitted over a longer distance. Therefore, the target signal can satisfy an application that requires a SIM card to be placed far away from a terminal device.

In addition, it should be noted that the described apparatus embodiments are merely exemplary. The units described as separate parts may or may not be physically separate, and parts displayed as units may or may not be physical units, and may be located in one position or may be distributed on a plurality of network units. Some or all of the modules may be selected according to actual requirements to achieve the objectives of the solutions of the embodiments in the present invention. In addition, in the accompanying drawings of the apparatus embodiments provided by the present invention, connection relationships between the modules indicate that the modules have communication connections with each other, which may be specifically implemented as one or more communications buses or signal lines. A person of ordinary skill in the art may understand and implement the embodiments of the present invention without creative efforts.

Based on the description of the foregoing implementation manners, a person skilled in the art may clearly understand that the present invention may be implemented by software in addition to necessary universal hardware, or by dedicated hardware, including an application-specific integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present invention, software program implementation is a better implementation manner in most cases. Based on such an understanding, the technical solutions of the present invention essentially or the part contributing to the prior art may be implemented in a form of a software product. The computer software product is stored in a readable storage medium, such as a floppy disk, a USB flash drive, a portable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, and the like) to perform the methods described in the embodiments of the present invention.

The foregoing describes the SIM card signal conversion method and apparatus provided in the embodiments of the present invention in detail. A person of ordinary skill in the art may, based on the idea of the embodiments of the present invention, make modifications with respect to the specific implementation manners and the application scope. Therefore, the content of this specification shall not be construed as a limitation to the present invention.

What is claimed is:

1. A subscriber identity module (SIM) card signal conversion method, comprising:
obtaining an original signal output by a SIM card;
determining a type of target signal among a plurality of types of target signals based on a port type of a terminal device, wherein the plurality of types of target signals comprises an RS232 signal, a low-voltage differential signal (LVDS) signal, and a universal serial bus (USB) signal;
converting the original signal into a target signal of the determined type, wherein one or more conversion chips for converting the original signal are determined based on the type of the target signal, the one or more conversion chips comprising at least two of: a first dedicated conversion chip, a field programmable logic gate array (FPGA), a second dedicated conversion chip, and a detachable device, wherein under an equal transmission condition and at an equal transmission distance, signal attenuation or distortion of the target signal is less than signal attenuation or distortion of the original signal, wherein when the determined type of the target signal is an RS232 signal, converting the original signal into a target signal comprises:

converting the original signal into a universal asynchronous receiver/transmitter (UART) signal using the first dedicated conversion chip or using the FPGA, and converting the UART signal into the RS232 signal using the second dedicated conversion chip or using the detachable device; and sending the target signal to the terminal device via a signal transmission line, wherein the SIM card is positioned external to the terminal device.

2. The method according to claim 1, wherein the original signal comprises at least one of the following: a logic gate circuit transistor-transistor logic (TTL) signal, or a complementary metal-oxide-semiconductor (CMOS) signal.

3. The method according to claim 1, wherein when the determined type of the target signal is a LVDS signal:

the one or more conversion chips for converting the original signal comprise a third dedicated conversion chip;

converting the original signal into a target signal comprises: converting the original signal into the LVDS signal by using the third dedicated conversion chip; and sending the target signal to a terminal device comprises: sending the LVDS signal to the terminal device.

4. The method according to claim 1, wherein when the determined type of the target signal is a USB signal:

the one or more conversion chips for converting the original signal comprise a fourth dedicated conversion chip;

converting the original signal into a target signal comprises: converting the original signal into the USB signal by using the fourth dedicated conversion chip; and sending the target signal to a terminal device comprises: sending the USB signal to the terminal device.

5. The method according to claim 1, wherein a requirement of the target signal for material of the signal transmission line, or a geometric structure of the signal transmission line, or technical processing of the signal transmission line is lower than a requirement of the original signal for the material of the signal transmission line, or the geometric structure of the signal transmission line, or the technical processing of the signal transmission line.

6. The method according to claim 1, wherein the terminal device is configured to restore the original signal from the target signal.

7. A signal conversion apparatus, comprising:

an interface configured to obtain an original signal outputted by a subscriber identity module (SIM) card;

a processor configured to determine a type of target signal among a plurality of types of target signals based on a port type of a terminal device, wherein the plurality of types of target signals comprises an RS232 signal, a low-voltage differential signal (LVDS) signal, and a universal serial bus (USB) signal;

a converter configured to convert the original signal into a target signal of the determined type, wherein one or more conversion chips within the converter for converting the original signal are determined based on the type of the target signal, the one or more conversion chips comprising at least two of: a first dedicated conversion chip, a field programmable logic gate array (FPGA), a second dedicated conversion chip, and a detachable device, wherein under an equal transmission condition and at an equal transmission distance, signal attenuation or distortion of the target signal is less than signal attenuation or distortion of the original signal, wherein to convert the original signal into the target signal when the deteiinined type of the target signal is an RS232 signal, the converter is configured to:

convert the original signal into a universal asynchronous receiver/transmitter (UART) signal using the first dedicated conversion chip or using the FPGA, and convert the UART signal into the RS232 signal using the second dedicated conversion chip or using the detachable device; and a second interface configured to send the target signal to the terminal device via a signal transmission line, wherein the SIM card is positioned external to the terminal device.

8. The signal conversion apparatus according to claim 7, wherein the original signal comprises at least one of the following: a logic gate circuit transistor-transistor logic (TTL) signal, or a complementary metal-oxide-semiconductor (CMOS) signal.

9. The signal conversion apparatus according to claim 7, wherein when the determined type of the target signal is a LVDS signal:

the one or more conversion chips for converting the original signal comprise a third dedicated conversion chip;

the converter is configured to convert the original signal into the LVDS signal by using the third dedicated conversion chip; and the second interface is configured to send the LVDS signal to the terminal device.

10. The signal conversion apparatus according to claim 7, wherein when the determined type of the target signal is a USB signal:

the one or more conversion chips for converting the original signal comprise a fourth dedicated conversion chip;

the converter is configured to convert the original signal into the USB signal by using the fourth dedicated conversion chip; and the second interface is configured to send the USB signal to the terminal device.

11. The signal conversion apparatus according to claim 7, wherein a requirement of the target signal for material of the signal transmission line, or a geometric structure of the signal transmission line, or technical processing of the signal transmission line is lower than a requirement of the original signal for the material of the signal transmission line, or the geometric structure of the signal transmission line, or the technical processing of the signal transmission line.

12. The signal conversion apparatus according to claim 7, wherein the terminal device is configured to restore the original signal from the target signal.

* * * * *